Dec. 23, 1969  G. E. MERCIER  3,485,979
PROTECTIVE GAP AND BY-PASS SWITCH FOR SERIES
CAPACITOR INSTALLATIONS
Filed Feb. 27, 1967  3 Sheets-Sheet 1

WITNESSES
Theodore F. Wrobel
James F. Young

INVENTOR
George E. Mercier
BY
ATTORNEY

United States Patent Office 3,485,979
Patented Dec. 23, 1969

3,485,979
PROTECTIVE GAP AND BY-PASS SWITCH FOR SERIES CAPACITOR INSTALLATIONS
George E. Mercier, Bloomington, Ind., assignor to Westinghouse Electric Corporation, Pittsburgh, Pa., a corporation of Pennsylvania
Filed Feb. 27, 1967, Ser. No. 618,641
Int. Cl. H01h 33/82; H02h 7/16
U.S. Cl. 200—148                                                    10 Claims

ABSTRACT OF THE DISCLOSURE

A protective device for series capacitor installations consisting of a combined load break by-pass switch and a plurality of protective gap devices. The gap devices and switch are disposed in a common housing with a common gas blast means for extinguishing arcs in the gaps or in the switch. The gap devices are individually connected across portions of a capacitor segment and the switch is electrically in parallel with all the gap devices. The device may be provided as a two-pole, multiple gap per pole switch with common control means.

Background of the invention

The present invention relates to a combined load break by-pass switch and protective gap device for a series capacitor installation and, more particularly, to an improved protective device of the type disclosed in a copending application Ser. No. 390,288, filed Aug. 18, 1964, by Ralph E. Marbury, now Patent 3,385,941, issued May 28, 1968, and assigned to the Westinghouse Electric Corporation.

As explained in the aforesaid copending application, a series capacitor installation can be used in a distribution line to compensate for line inductive reactance and thus improve voltage regulation. In high voltage long distance transmission lines, series capacitor installations are used primarily to compensate for series inductive reactance in the line, thereby increasing the stability limit or power transmission limit of the line, or to control the division of power between parallel operatng lines.

In a series capacitor installation, the capacitor units have a voltage rating determined on the basis of capacitor voltage under normal load current conditions, and a protective system including by-pass circuit means protects the capacitor against overvoltage under fault current conditions. To provide adequate capacitor protection, the protective system must operate to by-pass the capacitor substantially instantaneously upon the occurrence of an overvoltage of predetermined magnitude, that is, the capacitor must be effectively by-passed within the first half-cycle of fault current. For this reason, arc gaps are utilized for such protection purposes since no switch, or other mechanical device involving moving parts, can operate with the required speed.

A series capacitor installation in a high voltage long distance transmission line requires a protective system which reliably provides both for immediately by-passing the capacitor upon the occurrence of line fault current and for reinserting the capacitor in the line immediately upon the termination of the fault condition. Such a system is disclosed in the aforesaid copending application in which a series capacitor installation comprises a capacitor bank divided into a plurality of series capacitor segments, each segment consisting of a plurality of individual capacitors connected in a suitable series or series-parallel arrangement. The protective system comprises gap means and load break by-pass switch means for each segment cooperatively combined in a single device. The by-pass switch means is necessary to protect the gap against damage from continued arcing and also to permit the capacitors to be by-passed and removed from the line, and thereafter reinserted, as desired for inspection and maintenance or for other purposes. The combined protective device includes at least a pair of switch contacts and a pair of gap electrodes, and gas blast means are provided for extinguishing arcs between the gap electrodes and between the switch contacts.

The combined protective device of the prior application has a single set of switch contacts and a single pair of gap electrodes for connection across a single capacitor segment of a series capacitor installation. Thus, each capacitor segment has its own single pole switch and individual protective gap. In many cases, rapid reinsertion of the capacitor in the line is required after a fault is cleared and the protective gap must be able to interrupt the by-pass current if the by-pass switch has not operated. The carbon gaps used in these devices, however, have limits on their interrupting ability. In a typical case, for example, if the current to be interrupted is 3000 amperes, the maximum voltage across the capacitor segment at which the gap would reliably interrupt the current would be about 8000 volts. The maximum size of the capacitor segment would thus be limited to 20,000 kvar., the nominal or normal continuous current in this case being about 1500 amperes. This limitation on the size of the capacitor segments makes it necessary to divide the series capacitor bank into a greater number of segments than would otherwise be desirable, with substantially increased cost for the additional switches, control equipment, supporting structures and other associated equipment.

The principal object of the present invention is to provide a combined switching device and protective gap means for series capacitor installations in which two or more gap devices are combined with a single pole switch for connection across a capacitor segment. In this way, each gap device can protect a portion of the capacitor segment and the permissible size of the segment is increased, being doubled for example if two gap devices per switch are used. The total number of segments in a complete series capacitor installation is thus greatly reduced with a corresponding saving in cost.

Another object of this invention is to provide a higher voltage rated and higher kva. rated gap by-pass switch for use with series capacitor installation, thereby resulting in larger capacitor segment sizes.

A further object of the invention is to reduce the number of current limiting reactors and by-pass switches required in a series capacitor protective system.

Other objects of the invention will be explained fully hereinafter or will be apparent to those skilled in the art.

Summary of the invention

In accordance with the invention, a single pole by-pass switch is combined with a plurality of protective gaps in a single device to provide an arc gap for protecting each capacitor segment in a series capacitor installation. The arc gaps are mounted in the device in back-to-back relation to save space and simplify the structure. Two such switches may be provided with common operating and control means to form a two pole, multiple gap per pole switch for protecting two capacitor segments or two portions of a single segment. A common gas blast arc extinguishing means is provided to extinguish arcs between the switch contacts of each pole and between the gap electrodes associated with each pole. Current limiting reactors are provided to limit transient currents through the arc gaps. They are so connected that the number of reactors required is less than the number of arc gaps.

Brief description of the drawings

For a better understanding of the nature and objects of the invention, reference may be had to the following detailed description, taken in conjunction with the accompanying drawings, in which.

Description of preferred embodiments

Figure 1:
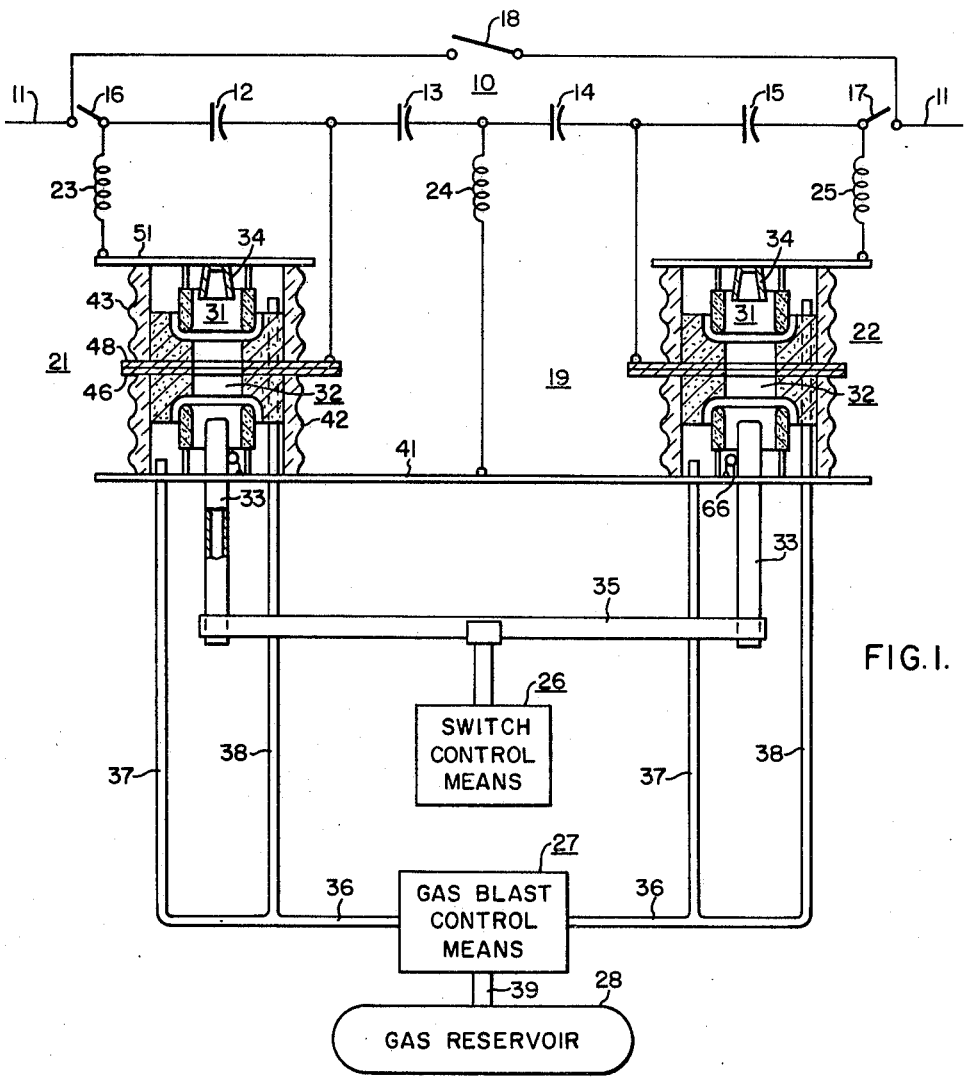
FIGURE 1 is a diagrammatic view of a series capacitor installation embodying principal features of the invention.

In FIG. 1 of the drawings there is shown a series capacitor installation 10 in a transmission line 11. The line 11 represents one phase of a three-phase transmission system. It will be understood that the other phases include apparatus similar to that shown in FIG. 1. The installation 10 includes four capacitors, 12, 13, 14 and 15. Each capacitor comprises a suitable number of individual capacitor units connected to each other in series or series-parallel to provide the desired capacitive reactance and current capacity, and they are connected in series-circuit relation in the line 11. The term "capacitor" as used herein, is to be understood as including any necessary number of individual capacitor units. The assembly 10 may constitute a single capacitor segment having two portions comprising the capacitors 12 and 13 and the capacitors 14 and 15 respectively. The complete installation may of course include additional segments.

Isolating disconnecting switches 16 and 17 and a by-pass disconnecting switch 18 are provided for by-passing and isolating the capacitor installation for inspection and maintenance. The switches 16, 17 and 18 may be manually operated and they need not have load break characteristics. When it is desired to perform maintenance, the switch 18 is close to provide a shunt path around the capacitor installation, after which the switches 16 and 17 are opened to isolate the segment. After maintenance, the isolation switches 16 and 17 can be reclosed and the by-pass switch 18 reopened to put the capacitor installation back into service.

A protective system 19 is provided for protecting the capacitors 12, 13, 14 and 15 against overvoltage conditions produced by fault currents in the line 11. The protective system 19 includes two combined protective gap and load break by-pass switch devices 21 and 22, three reactors 23, 24 and 25, switch control and operating means 26, gas blast control means 27 and a gas reservoir 28.

As explained hereinbefore, a series capacitor installation in a high voltage long distance transmission line requires a protective system which provides for immediately by-passing the capacitor upon the occurrence of a line fault current and for reinserting the capacitor in a line upon a termination of the fault condition. Such a system is disclosed in the aforesaid copending Marbury application in which protective gap means and load break by-pass switch means are combined in a single device. However, in the aforesaid prior device each pair of switch contacts has only one pair of gap electrodes, associated with it, and a capacitor segment having two series capacitors with a gap for each capacitor requires a two-pole by-pass switch. The size of such a segment is undesirably limited by the reinsertion capability of the carbon gaps across each capacitor, as previously explained.

In order to provide a higher voltage rated and higher kvar. rated gap by-pass switch, the devices 21 and 22 are combined into a two-pole switch having a common operating means and each device has a plurality of arc gaps per pole. The device 21, which constitutes one pole, includes arc gaps 31 and 32 which may be by-passed by a movable switch contact member 33 engaging a fixed contact member 34. The device 22, which constitutes the other pole, is similar to the device 21 and includes corresponding arc gaps 31 and 32 and switch members 33 and 34. The movable switch members are operated by a common operating bar 35, which, in turn, is operated by the operating means 26. The arc gaps 31 and 32 are mounted in each device in back-to-back relation, thereby saving space and simplifying the structure.

In order to limit the transient current through the arc gaps the current limiting reactors 23, 24 and 25 are provided. The reactor 23 is connected in series-circuit relation with the arc gap 31 of the device 21 which is connected across the capacitor 12. The reactor 24 is connected in series with the arc gap 32 of the device 21 which is connected across the capacitor 13. The reactor 24 is also connected in series with the arc gap 32 of the device 22 which is connected across the capacitor 14. The reactor 25 is connected in series with the arc gap 31 of the device 22 which is connected across the capacitor 15. Thus, only three current limiting reactors are required for the four capacitors and four arc gaps. However, a current limiting reactor is provided in the shunt circuit for each one of the capacitors.

The gas blast control means 27 is common to both poles of the two-pole unit. A gas, such as compressed air, is utilized to extinguish arcs between the switch contacts of each pole and between the gap electrodes associated with each pole. Insulating pipes 36, 37 and 38 connect the control means 27 with the devices 21 and 22. The gas reservoir 28 is connected to the control means through a pipe 39. The gas enters each switch device through the pipes 37 and 38 and is exhausted through the movable contact 33 which is hollow or tubular in structure. The entire installation including the capacitors, the protective by-pass switches and control equipment is mounted on a suitable supporting structure which insulates them from ground since they are at the relatively high transmission line voltage. Air may be supplied to the reservoir from ground level by means of an insulating air column, as shown in Marbury Patent 2,597,012, for example.

Figure 2:
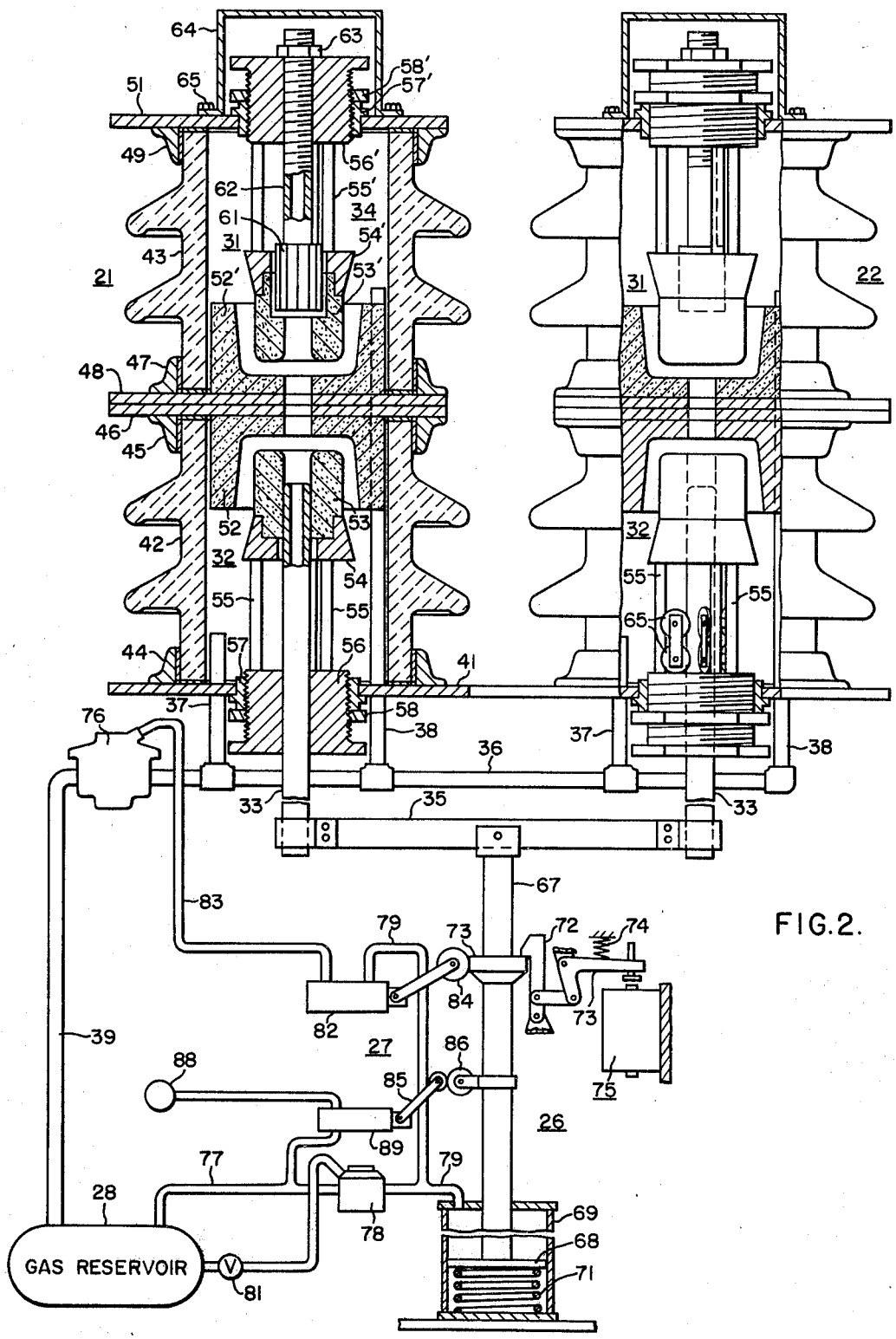
FIG. 2 is a view, partly in section and partly in elevation, of the combined protective gap and load break by-pass switch device utilized in the installation shown in FIG. 1.

The structure of the two-pole, multiple gap per pole load break by-pass switch and operating mechanism is shown more clearly in FIG. 2. Since the two poles 21 and 22 are similar in construction, the structure of the pole 21 will be described in detail. The two poles 21 and 22 are mounted on a common metal base 41. The base 41 may be mounted on a suitable supporting structure (not shown).

The pole unit 21 includes two cylindrical housings 42 and 43 which are made of porcelain or other suitable insulating material. The lower end of the housing 42 is cemented inside a flanged ring 44 which is attached to the base 41, preferably by bolts (not shown). The upper end of the housing 42 is cemented inside a flanged ring 45 which is attached to a metal cover plate 46. The lower end of the housing 43 is cemented inside a flanged ring 47 which is attached to a metal base plate 48 disposed on top of the cover plate 46. The plates 46 and 48 may be secured together as by bolting or welding. The upper end of the housing 43 is cemented inside a flanged ring 49 to which is attached a metal cover plate 51. The plates 41, 46, 48 and 51 function as terminal members for making electrical connections to the switch unit. The electrical connections are shown in FIG. 1.

The arc gap 32 is disposed inside the housing 42 and the arc gap 31 is disposed inside the housing 43. The arc gap 32 comprises electrodes 52 and 53. The electrode 52 is a generally cup-shaped member which is attached to the plate 46 in an inverted position. The electrodes 52 and 53 are made of a suitable material, such as graphite. The electrode 53 is generally cylindrical and tubular with its lower end attached to a metal base 54. The base 54 is supported by rods 55, the lower ends of which are attached to a metal bushing 56. The bushing 56 is threaded into a collar 57 which is secured in an opening in the base 41 as by welding. The height of the electrode 53 may be adjusted by turning the bushing 56 in the collar 57, thereby adjusting the gap distance between the electrodes 52 and 53. A lock nut 58 is provided on the bushing 56.

The arc gap 31 is similar to the gap 32 with the exception that the electrode 52' is mounted on the base 48 in an upright position and the electrode 53' is disposed in an inverted position. Thus, the arc gaps 31 and 32 are mounted in back-to-back relation, thereby saving space in the switch structure. Also, since the members of the arc gap are similar in structure their manufacture is simplified.

As shown, central openings are provided in the members 56, 54, 53, 52, 46, 48, 52' and 53' to permit the movable switch contact member 33 to pass through the members to engage the fixed contact member 34. The contact member 34 may be of a type well known in the switch art and comprises a plurality of fingers 61 mounted on a supporting member 62 which is threaded into the bushing 56'. Thus, the height of the contact member 34 may be adjusted to be properly engaged by the member 33 when the member 33 is in its uppermost position. A lock nut 63 is provided on the member 62. A cap 64, which encloses the bushing 56', may be attached to the cover plate 51 by bolts 65.

As previously explained, compressed air to other suitable arc extinguishing means, enters the housings 42 and 43 through insulating pipes 37 and 38, respectively. It is exhausted through the contact member 33 which is of hollow construction. The member 62 may also be made hollow to permit the interrupting medium to be exhausted through this member.

In order to conduct current between the moving contact members 33 and the base 41, a conductive connection is established at all times between the contact members 33 and the electrode supporting rods 55. As shown in the right-hand portion of FIG. 2, rollers 66 are movably disposed between the contact member 33 and the rods 55. Similar rollers 66 are provided for the pole unit 21, thereby making provision for conducting current between either one or both of the movable contact members 33 and the base 41.

The switch operating means 26 comprises a rod 67, the upper end of which is attached to the horizontal cross bar 35, the ends of which are attached to the contact members 33. The lower end of the rod 67 is attached to a piston 68 disposed inside a cylinder 69. A spring 71 inside the cylinder 69 biases the piston 68 and the rod 67 upwardly. The switch contact members 33 are retained in the open position by a pivoted latch 72 which engages a ring 73 secured to the rod 67. The latch 72 is released by a bell crank lever 73 which is biased to the position shown in the drawings by a spring 74. The lever 73 is actuated to release the latch 72 by a tripping mechanism shown generally at 75.

The tripping mechanism can be responsive to various conditions to release the latch 72 and permit the spring 71 to close the by-pass switch contact members. The conditions under which the by-pass switch contact members are closed preferably include a sustained capacitor overvoltage, an excessive arc current between the arc gap electrodes, or loss of gas pressure in the gas blast control system 27. The tripping mechanism may be operated in response to any of these conditions by any suitable means such as that shown in a copending application of W. H. Cuttino, Ser. No. 403,097, filed Oct. 12, 1964, now Patent 3,335,362, issued Aug. 8, 1967.

The gas blast control means 27 provides for automatic delivery of gas from the reservoir 28 to the inside of the switch housing to extinguish a by-pass arc between the gap electrodes shortly or immediately after the line fault which initiated the arc is cleared. The gas blast control means may be arranged to operate in the manner described in Patent 2,660,693, issued Nov. 24, 1953 to R. E. Marbury and assigned to the Westinghouse Electric Corporation.

The system described in the aforesaid patent provides for maintaining a continuous flow of interrupting gas during the time that the fault current exists. Thus, the arc is extinguished at each current zero during the period of the fault current condition and the arc is extinguished at the first current zero after the time at which the fault is cleared.

As shown, the gas blast control means 27 includes a solenoid and pressure operated valve 76 which is of a commercially available type. The valve 76 controls the flow of gas from the reservoir 28 through the pipe 39 into the pipe 36 which in turn supplies the pipes 37 and 38 which direct the gas into the switch housings 42 and 43. As described in the aforesaid patent, the valve 76 is operated in response to a predetermined flow of current across any one of the arc gaps to permit the arc extinguishing gas to enter the switch housings.

The gas reservoir 28 also provides the gas pressure needed for actuating the piston 68 in the cylinder 69 through a pipe 77, a pilot valve 78 and the pipe 79. The pilot valve 78 is controlled by a control valve 81. The valves 78 and 81 are of commercially available types. The valve 81 may be manually operated. The valve 78 is preferably a three-way valve providing for exhausting the pipe 79 when the valve is closed.

A two-way valve 82 connects the pressure pipe 79 to the gas blast valve 76 through a pipe 83. The valve 82 provides signal pressure for operating the valve 76 when gas pressure is delivered to the operating cylinder 69 through the pipe 79 to open the switch contact members 33. The valve 82 is actuated to an open position when the operating rod 67 is raised to disengage the ring 73 from the cam actuator 84 for the valve 82. Thus, the valve 82 is free to deliver gas pressure to operate the gas blast valve 76 upon the appearance of switch opening pressure in the pipe 79. The valve 82 is closed by the cam actuator 84 when the operating rod 67 is in its lowermost position.

Simultaneously, a cam actuator 85 is engaged by a roller 86 carried by the operating rod 67 to operate a three-way valve 87 to admit pressure from the pipe 77 to an indicating device 88 to indicate that the by-pass switch is in the open position. When the switch is in the open position the valve 81 may be actuated to operate the pilot valve 78 to exhaust the pipe 79 and the cylinder 69. However, the by-pass switch contact members are retained in the open position by the latch 72 as previously explained. Thus, the spring 71 in the cylinder 69 can immediately close the by-pass switch contact members when the latch 72 is released as hereinbefore explained.

Figure 4:
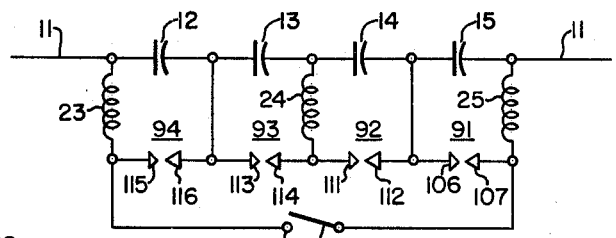
FIG. 4 is a schematic diagram of a series capacitor installation utilizing the modified protective gap and load break switch device shown in FIG. 3.
Figure 3:
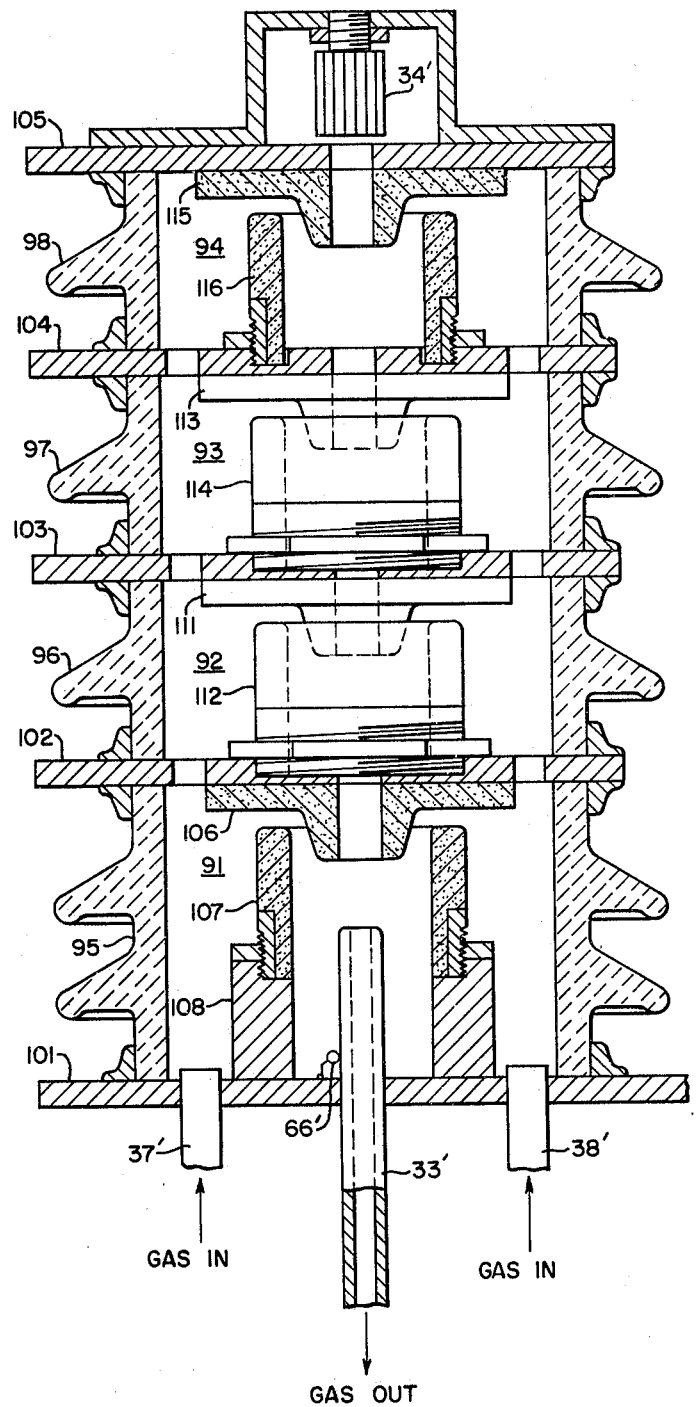
FIG. 3 is a view, in vertical section, of a modification of the protective gap and load break switch device.

In the modification of the invention shown in FIG. 3 one movable switch contact member 33' engages a fixed contact member 34' to by-pass four pairs of gap electrodes 91, 92, 93 and 94. The electrodes 91, 92, 93 and 94 are disposed inside insulating housing 95, 96, 97 and 98, respectively. The housing 95 is mounted between metal plates 101 and 102, the housing 96 is mounted between the plate 102 and a plate 103, the housing 97 is mounted between the plate 103 and a plate 104, and the housing 98 is mounted between the plate 104 and a cover plate 105. The metal plates function as terminal members for making electrical connections to the switch unit. The electrical connections are shown in FIG. 4.

The arc gap 91 includes a fixed electrodes 106 which is mounted on the bottom side of the plate 102 and an adjustable electrode 107 which is mounted on a threaded support member 108 which, in turn, is mounted on the plate 101. The arc gap 92 includes a fixed electrode 111 mounted on the bottom side of the plate 103 and an adjustable electrode 112 which is threaded into the upper side of the plate 102. The arc gap 93 includes a fixed electrode 113 mounted on the bottom side of the plate 104 and an adjustable electrode 114 mounted on the upper side of the plate 103. Likewise, the arc gap 94 includes a fixed electrode 115 mounted on the bottom side of the plate 105 and an adjustable electrode 116 mounted on the upper side of the plate 104. Thus, the fixed electrode and the adjustable electrode of adjacent pairs of gap electrodes have a common electrical connection. The electrodes have central openings to permit the contact member 33' to pass through them to engage the contact member 34'. In this manner, the number of pairs of electrodes which are by-passed by a single pole switch may be increased to any number within the capacity of the switch. Also, the electrode members are of a similar construction, thereby simplifying their manufacture. The switch may be controlled and operated in the manner hereinbefore described.

From the foregoing description it is apparent that the invention provides for making a higher voltage rating and a higher kva. rating gap by-pass switch for use with series capacitor installations. This results in larger capacitor segment sizes. The invention also provides for reducing the number of current limiting reactors required in a series capacitor installation.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. A protective device for series capacitor installations, said device comprising housing means, switch means disposed in said housing means, a plurality of protective gap devices disposed in the housing means adjacent the switch means, each of said gap devices including a pair of spaced electrodes and having terminal means so that the gap devices are separately connectible across portions of the series capacitor installation, the switch means being electrically in parallel with the gap devices, and means for introducing arc-extinguishing gas into the housing to extinguish arcs in the switch means and the gap devices.

2. A protective device as defined in claim 1 in which the switch means includes a stationary contact and a linearly movable contact and each of the gap devices includes a pair of spaced electrodes, the gap devices being disposed along the path of movement of the movable switch contact.

3. A protective device as defined in claim 1 in which the switch means includes a stationary contact and a linearly movable contact, each of the gap devices including a pair of spaced electrodes having central openings therein, and the electrodes of all the gap devices being disposed with their central openings aligned and in position for said movable contact to pass through the openings.

4. A protective device as defined in claim 3 in which said movable contact is tubular to permit escape of said gas.

5. A protective device for series capacitor installations, said device comprising housing means, a plurality of gap electrodes disposed in longitudinal alignment in the housing means, said electrodes being arranged to form a plurality of gap devices each consisting of a pair of spaced electrodes, means for effecting electrical connection to each gap device, a stationary switch contact at one end of the housing means, a linearly movable contact movable into and out of engagement with the stationary switch contact, the gap electrodes being disposed along the path of movement of the movable switch contact, and means for introducing arc-extinguishing gas into the housing to extinguish arc between the gap electrodes and between the switch contacts.

6. A protective device as defined in claim 5 in which the gap electrodes have aligned central openings and the movable switch contact passes through said openings.

7. A protective device as defined in claim 6 in which said movable contact is tubular to permit escape of said gas.

8. A protective device as defined in claim 6 in which each pair of gap electrodes consists of a generally cup-shaped electrode and a cylindrical electrode disposed within the cup-shaped electrode and adjustably supported in spaced relation thereto.

9. A protective device as defined in claim 8 in which adjacent cup-shaped electrodes are disposed in back-to-back relation with a common electrical connection thereto.

10. A protective device as defined in claim 6 which has more than two gap devices, each gap device having an adjustably supported cylindrical electrode and a fixed electrode having a portion extending into the cylindrical electrode.

References Cited
UNITED STATES PATENTS

| | | |
|---|---|---|
| 2,351,989 | 6/1944 | Marbury. |
| 2,576,132 | 11/1951 | Marbury. |
| 2,597,012 | 5/1952 | Marbury. |
| 2,660,693 | 11/1953 | Marbury. |
| 2,760,121 | 8/1956 | Roth _____ 200—148 X |
| 3,385,941 | 5/1968 | Marbury _____ 200—148 |

ROBERT S. MACON, Primary Examiner

U.S. Cl. X.R.

317—12